US005778352A

United States Patent [19]

Inoue et al.

[11] Patent Number: 5,778,352
[45] Date of Patent: *Jul. 7, 1998

[54] ELECTRONIC DOCUMENT RETRIEVAL AND DISPLAY SYSTEM AND METHOD OF RETRIEVING ELECTRONICALLY STORED DOCUMENTS

[75] Inventors: Shinji Inoue, Neyagawa; Takashi Kakiuchi, Osaka; Hiroki Nakamura; Hiroyuki Waki, both of Osaka; Masahiro Oashi, Hirakata, all of Japan

[73] Assignee: Matsushita Electric Industrial Co., Ltd., Osaka, Japan

[*] Notice: The term of this patent shall not extend beyond the expiration date of Pat. No. 5,581,752.

[21] Appl. No.: 660,549

[22] Filed: Jun. 7, 1996

Related U.S. Application Data

[62] Division of Ser. No. 153,150, Nov. 15, 1993, Pat. No. 5,581,752.

[30] Foreign Application Priority Data

Nov. 17, 1992 [JP] Japan ................................ 4-307030

[51] Int. Cl.⁶ .................................................. G06F 17/30
[52] U.S. Cl. ............................ 707/1; 707/515; 707/526
[58] Field of Search .............................. 395/761, 782, 395/783, 779, 787, 788, 326; 358/403; 707/1, 104, 515, 526

[56] References Cited

U.S. PATENT DOCUMENTS

| | | | |
|---|---|---|---|
| 4,205,780 | 6/1980 | Burns et al. | 235/454 |
| 4,445,795 | 5/1984 | Levine et al. | 400/63 |
| 4,633,430 | 12/1986 | Cooper | 707/500 |
| 4,931,984 | 6/1990 | Ny | 707/101 |
| 5,047,868 | 9/1991 | Takeda et al. | 386/109 |
| 5,204,946 | 4/1993 | Shimamura | 707/515 |
| 5,214,755 | 5/1993 | Mason | 707/520 |
| 5,337,406 | 8/1994 | Takakura et al. | 707/520 |
| 5,369,742 | 11/1994 | Kurosu et al. | 707/522 |

FOREIGN PATENT DOCUMENTS

| | | |
|---|---|---|
| 123109 | 10/1984 | European Pat. Off. |
| 9000776 | 12/1987 | WIPO |

OTHER PUBLICATIONS

"Profiles in Document Managing", by R. Ga Côté, Byte, Sep. 1992.

"Intermedia: The Architecture and construction of an Object-Oriented Hypermedia System and Applications Framework," by N. Meyrowitz, Iris, Sep. 1985.

Primary Examiner—Thomas G. Black
Assistant Examiner—Jack M. Choules
Attorney, Agent, or Firm—Price, Gess & Ubell

[57] ABSTRACT

The present invention provides an electronic document filing system. The electronic document filing system comprises a document database for storing document, an input unit for controlling the system, a document data generating unit for generating the document data, a layout data generating unit for generating layout data, a display unit for displaying the data generated by the document data generating unit and layout data generating unit, and a control unit for controlling the display unit to send image data of the page being retrieved to the layout data generating unit upon receipt of a retrieval command from the input unit to display the resulting data of a conversion into the layout data, and to send the image data of the specified page to the document data generating unit to display the image data of the specified page in a legible image.

27 Claims, 11 Drawing Sheets

ELECTRONIC DOCUMENT RETRIEVAL AND DISPLAY SYSTEM AND METHOD OF RETRIEVING ELECTRONICALLY STORED DOCUMENTS

This is a division of prior application Ser. No. 08/153,150, filed on Nov. 15, 1993, now U.S. Pat. No. 5,581,752, for an ELECTRONIC DOCUMENT FILING SYSTEM AND METHOD OF RETRIEVING FILED DOCUMENTS.

BACKGROUND OF THE INVENTION

1. Field of the Invention

The present invention relates to the construction of an electronic document filing system having a document retrieving function for sequentially displaying electronic documents filed in a database page by page, or a so-called page-turning retrieval function, and to a method thereof.

2. Description of the Related Art

As word processors and Desk Top Publishing (DTP) systems have become popular, not only preparing a document in the form of electronic data, but also storing the electronic document into a database has become common. Given these circumstances, research on techniques that facilitate retrieving a desired document from the database have been actively performed.

The electronic document filing system disclosed, for example, in U.S. Pat. No. 4,931,984 or U.S. Pat. No. 5,047,868 is known as an electronic document filing system that stores an electronic document to display it for retrieval in a later time.

Figure 1:
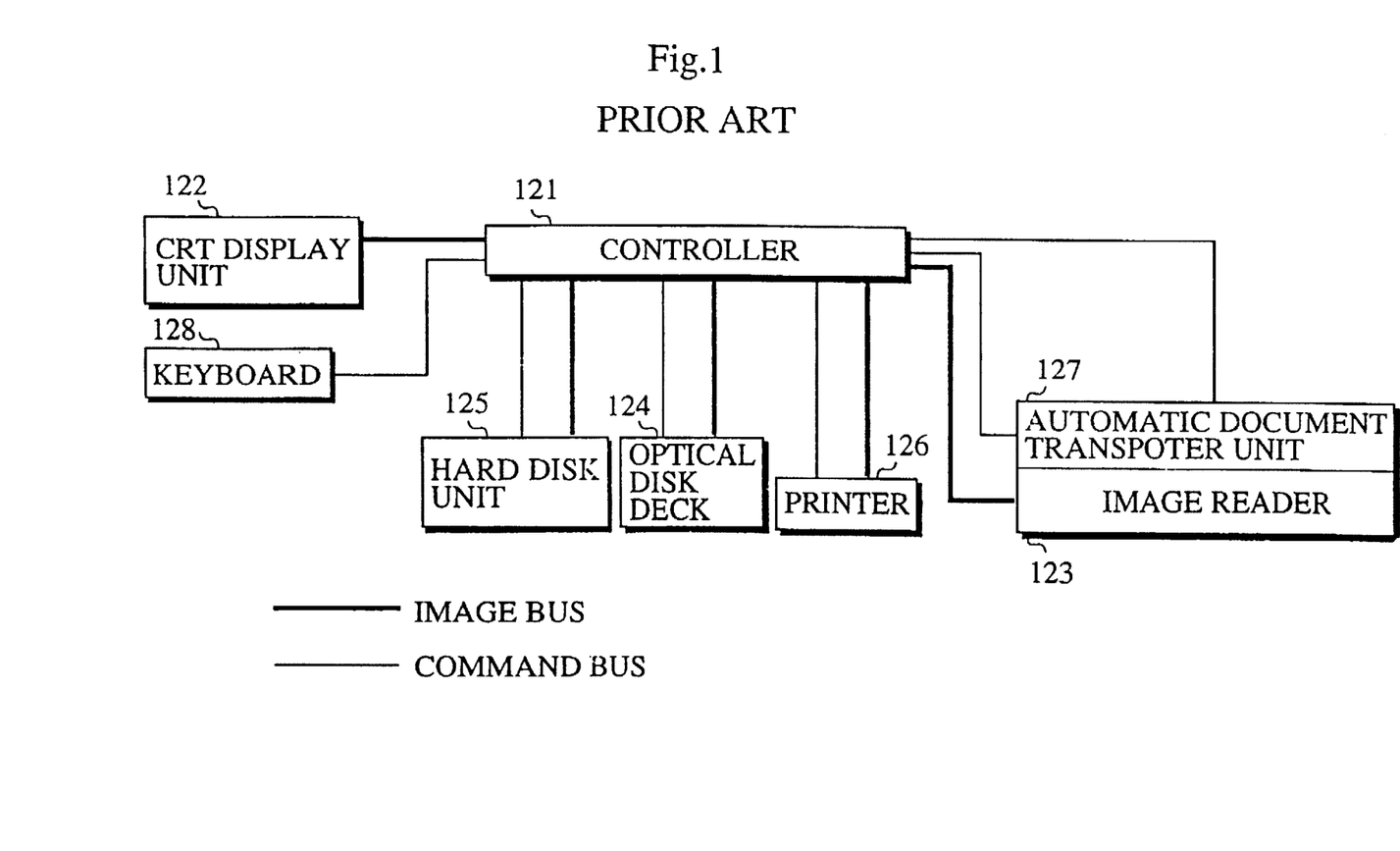
FIG. 1 is a block diagram depicting the construction of a conventional electronic document filing system.

FIG. 1 is a block diagram depicting the construction of a conventional electronic document filing system. The electronic filing system comprises a controller 121, a CRT display unit 122, an image reader 123, an optical disk deck 124, a hard disk unit 125, a printer 126, an automatic document transporter unit 127, and a keyboard 128. The CRT display unit 122, image reader 123, and controller 121 are connected by image buses, while the optical disk deck 124, hard disk unit 125, printer 126, and controller 121 are connected by the image buses and command buses. Further, the automatic document transporter unit 127, keyboard 128, and controller 121 are connected by the command buses.

The conventional electronic document filing system constructed as above operates in the following way.

First, the operation for filing a document with the electronic document filing system will be explained. Once a document is set on the automatic document transporter unit 127, the automatic document transporter unit 127 automatically transports the document onto a scanner of the image reader 123. Then, the image reader 123 reads the document to convert it into image data, and outputs the document image data to the controller 121. The controller 121 stores the document image data into the optical disk deck 124 upon the receipt thereof. Simultaneously, the controller 121 stores two other data into the optical disk deck 124: a key word corresponding to the document that a user has entered with the keyboard 128 and retrieval-use-image data produced by applying a pixel skipping method to the document image data so as to match the resolution thereof with the CRT display unit 122. The location of these data in the optical disk deck 124 are stored into the hard disk unit 125.

Next, the operation for retrieving a desired document from the filed documents will be explained. To begin with, the user enters the key word for retrieval with the keyboard 128. Accordingly, document data corresponding to the key word are extracted from the optical disk deck 124. Subsequently, so-called page-turning retrieval is performed, whereby the user can find a desired document or page from the extracted document data. In other words, the extracted document data are sequentially displayed page by page on the screen of the CRT display unit 122 as if the user was turning the pages of a book. Note that the document data displayed on the screen are the retrieval-use-image data produced through the pixel skipping method at the time of document filing. The operator changes the displays on the screen sequentially as he watches the images of the retrieval-use-image data until he finds the desired document or page. The data related to the document found in this way are outputted to the printer 126 in accordance with a command entered with the keyboard 128. Note that the data outputted to the printer are not the retrieval-use-image data, but the document image data initially produced by the image reader 123.

However, with the conventional electronic document filing system, it is necessary to produce the retrieval-use-image data prior to the page-turning retrieval, which necessitates an extra memory area for storage. Although the pixel skipping method is applied, the amount of the resulting data, or namely the retrieval-use-image data, is still massive; for the amount of the original image data is monumental. Given that a massive amount of data are processed in the extra memory, it takes quite long to display the retrieval-use-image data, which resulting in a problem of decreasing the overall retrieval speed.

There is another example of a conventional electronic document filing system, wherein data in a specific area within a document are retrieved and thence displayed sequentially. With this type of system, only electronic documents in a standard format are subject to the retrieval. Thus, the user specifies an area found in every page of the document such as a name column with the input unit. Accordingly, the system extracts the image data corresponding to the specified area among the stored document image data to sequentially display the corresponding image data alone. In this way, the page-turning retrieval is performed at a high speed.

However, the electronic document filing system described as above invariably displays the image data in the specified area whether there exists image data in the area or not; a blank is displayed when no image data exists. Although the blank display does not happen frequently when retrieving documents in the standard format, a blank or image data in a non-specified area may be displayed when retrieving documents in a variety of non-standard formats. When this happens, the time spent for retrieval turns to be a waste, causing the system to decrease the retrieval operation speed.

SUMMARY OF THE INVENTION

Accordingly, the present invention has an object to provide an electronic document filing system capable of performing efficient page-turning retrieval at a high speed with a simple operation.

The present invention has another object to simplify image display data in a retrieval mode.

Yet, the present invention has another object to provide a method of retrieving a document in an electronic file page by page at a high speed.

The above objects are fulfilled by an electronic document filing system of the present invention. The electronic document filing system comprises: a document database for storing document data; an input unit for entering a retrieval mode command for retrieving the document data page by page and a document display mode command for displaying a retrieved document; a layout data generating unit for generating layout data representing the outline of an area of each element contained in a page in accordance with the document data per page fetched from the document database; a document data generating unit for generating page image data for displaying a retrieved page in a legible image; a control unit for fetching the document data stored in the document database in accordance with the retrieval mode command from the input unit to output them to the layout data generating unit, and for fetching the document data of a page specified for display from the document database in accordance with the document display mode command from the input unit to output them to the document data generating unit; and a display unit for displaying the data generated by the document data generating unit and the layout data generating unit.

By constructing the system in such a way that it displays the layout of the page being retrieved, the page being retrieved can be-displayed at a high speed, making it possible to realize the electronic document filing system with a high retrieval efficiency.

The above objects are also fulfilled by another electronic document filing system of the present invention. The electronic document filing system comprises: a document database for storing document data; an input unit for entering an area location specifying an area subject to retrieval within a page, retrieval information defining image characteristics of the area subject to retrieval, and a retrieval mode command for retrieving the document data page by page; a document data generating unit for generating page image data for displaying a retrieved page in a legible image; a data detecting unit for retrieving data in the area subject to retrieval within the document data stored in the document database in accordance with the retrieval mode command and retrieval information from the input unit to output the document data of a page containing a data area to the document data generating unit when it detects a data area such that matches with the retrieval information; and a display unit for displaying the page image data generated by the document data generating unit.

The above objects are also fulfilled by another electronic document filing system of the present invention. The electronic document filing system comprises: a document database for storing document data; an input unit for entering an area location specifying an area subject to retrieval within a page, retrieval information defining image characteristics of the area subject to retrieval, a retrieval mode command for retrieving the document data page by page, and a document display mode command for displaying a retrieved document; a layout data generating unit for generating layout data representing the outline of the area of each element contained in a page in accordance with the document data fetched from the document database; a document data generating unit for generating page image data for displaying a retrieved page; a data detecting unit for retrieving data in the area subject to retrieval within the document data stored in the document database in accordance with the retrieval mode command and retrieval information from the input unit to output the image data in a data area to the document data generating unit when it detects a data area such that matches with the retrieval information, to output the document data other than the data outputted to the document data generating unit within the page containing the data area to the layout data generating unit, and to output the document data of a page specified for display in accordance with the document display mode command from the input unit to the document data generating unit; and a display unit for combining the document data from the document data generating unit and the layout data from the layout data generating unit to display the resulting data in the retrieval mode, and for displaying the document data generated by the document data generating unit in the document display mode.

The above objects are fulfilled by a method of retrieving a document in an electronic file of the present invention. With the method, in the first place, an area location specifying an area subject to retrieval within a page and retrieval information defining image characteristics of the area subject to retrieval are particularized. In the second place, data in the area subject to retrieval within the document data in the electronic file are retrieved to extract the document data of a page containing a data area such that matches with the retrieval information when a data area such that matches with the retrieval information is detected. Then, the document data of an extracted page are displayed.

The above objects are also fulfilled by another method of retrieving a document in an electronic file of the present invention. With the method, in the first place, an area location specifying an area subject to retrieval within a page and the retrieval information defining the image characteristics of the area subject to retrieval are particularized. In the second place, data in the area subject to retrieval within the document data in the electronic file are retrieved to fetch the document data of a page containing a data area such that matches with the retrieval information when a data area such that matches with the retrieval information is detected. Then, a portion of the document data of the retrieved page corresponding to the area subject to retrieval are displayed in a legible image, and the document data of the retrieved page corresponding to the areas other than the one subject to retrieval are displayed in a layout image representing the outline thereof.

As has been described, the electronic document filing system of the present invention is designed to retrieve a desired page by specifying an area subject to retrieval and defining the characteristics thereof. Thus, a user does not have to check all the pages on display, which contributes to enhancing overall work efficiency.

BRIEF DESCRIPTION OF THE DRAWINGS

These and other objects, advantages and features of the invention will become apparent from the following description thereof taken in conjugation with the accompanying drawings which illustrate specific embodiments of the invention. In the drawings.

DESCRIPTION OF THE PREFERRED EMBODIMENTS

The preferred embodiments of the present invention will be described in the following.

(First Embodiment)

Figure 2:
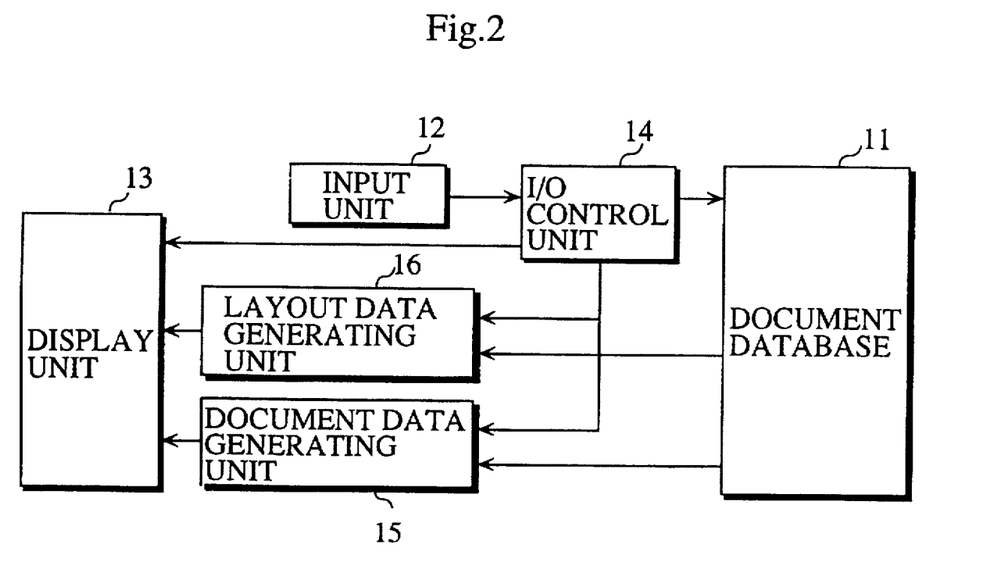
FIG. 2 is a block diagram depicting the construction of an electronic document filing system in accordance with the first embodiment of the present invention.

The electronic document filing system of the first embodiment is to display the layout of a page image of a document being retrieved. As is shown in FIG. 2, the electronic document filing system comprises a document database 11 for storing electronic documents, an input unit 12 for controlling the system, a display unit 13 for displaying layout data or document data, an input/output (I/O) control unit 14 for sending commands in accordance with the input information from the input unit 12, a document data generating unit 15 for generating the document data, and a layout data generating unit 16 for generating the layout data.

With the above-described electronic document filing system, in practice, the document database 11 is a medium with a massive capacity such as a CD-ROM or an optical disk; the input unit 12 is a keyboard or a mouse; the display unit 13 is a CRT or an LC(Liquid Crystal) display; and the I/O control unit 14, document data generating unit 15, and layout data generating unit 16 are the combination of a CPU, a memory and a hard disk.

Figure 3:
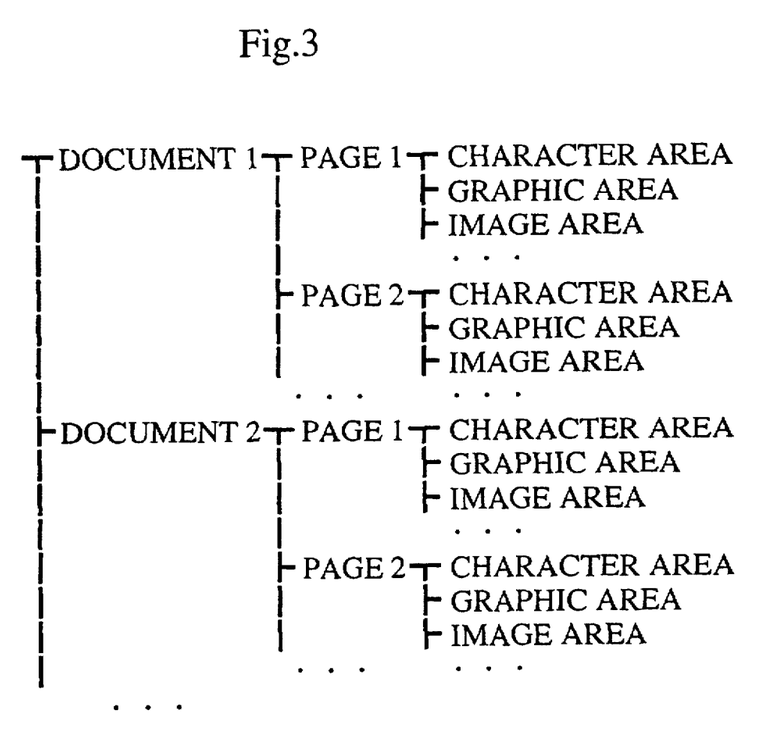
FIG. 3 is a view illustrating the contents of a document database of the electronic document filing system of the present invention.

The database 11 stores a plurality of document data. The document data, for example, has a hierarchial structure as is shown in FIG. 3. Stored in the first layer are a plurality of document titles, and stored in the second layer are page numbers corresponding to the titles stored in the first layer. The third layer has a character area, a graphic area, an image area for storing display data such as characters or figures. Stored in these-areas are a coordinate of the lower left, and that of the upper right of each rectangle encircling each of these areas. Further, the character area stores character data to be aligned in the corresponding rectangle; the diagram area stores data relating to lines such as straight lines, curved lines, and circles; and the image area stores bit map data representing an image within the document. With respect to the operation of the document database 11, when the document title is specified, the data relating to that title are read out from the second and third layers. In addition, when the title is specified, all of the documents are read out sequentially in a retrieval mode. The documents can be read out either in the forwards or backwards direction of the filed order.

Further, when the title and the page number are specified, the display data are read out from the corresponding page. As is with the above-described case, all of the documents are read out sequentially in the retrieval mode; they can be read out either the forwards or backwards direction of the filed order.

The function and the operation of the electronic document filing system of the first embodiment will be described.

Figure 4:
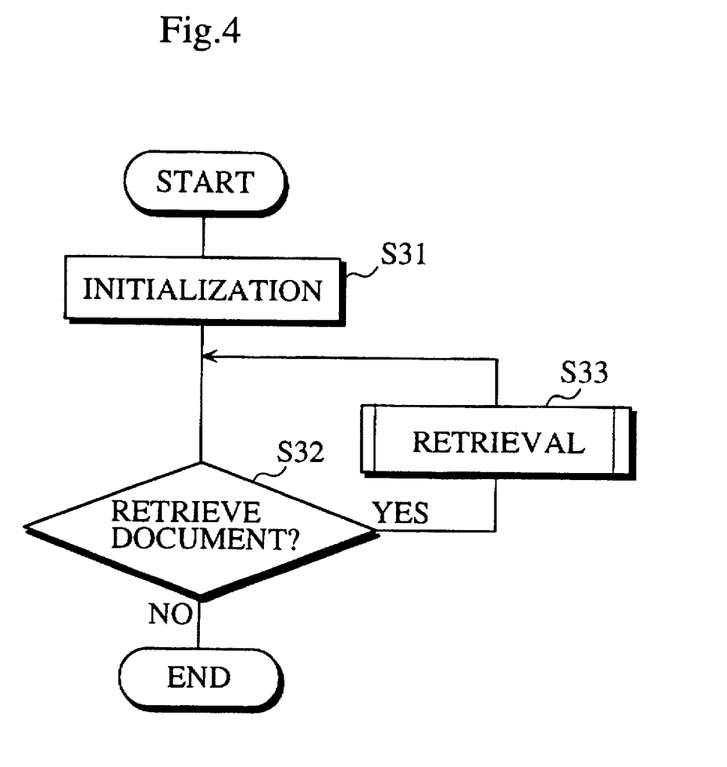
FIG. 4 is a flowchart detailing the main routine of the electronic document filing systems of the first, second, and third embodiments.

As is shown in FIG. 4, an initialization necessary at the system activation is performed in Step 31; the first page of the first document stored in the document base data 11 is set into a current page.

Next, a user enters a command as to whether or not he is going to proceed to retrieval with the input unit 12. In case of YES, a retrieval routine is called out in Step 33; otherwise, the program is terminated in Step 32.

Figure 5:
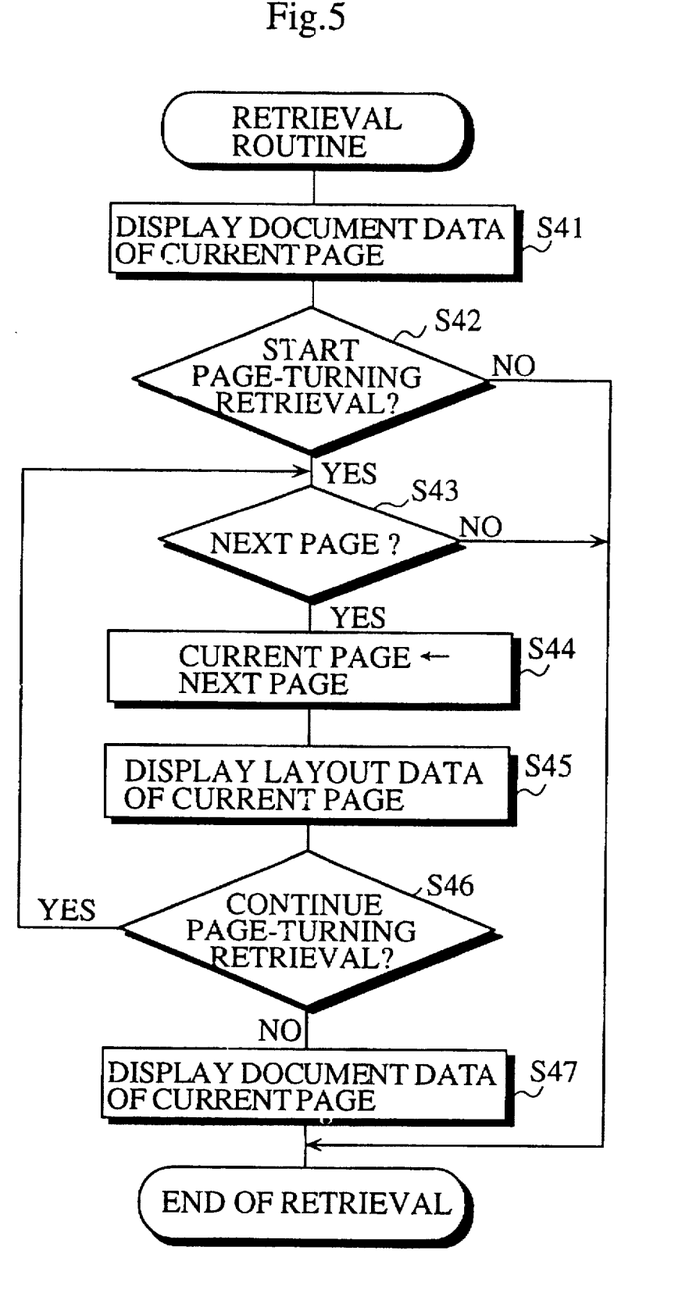
FIG. 5 is a flowchart detailing retrieval of the electronic document filing system of the first embodiment.

As is shown in FIG. 5, in a retrieval routine, the I/O control unit 14 sends a command to display the document data of the current page to the display unit 13 and document data generating unit 15. The document data generating unit 15 fetches the data of the current page stored in the document database 11 in accordance with the aforementioned command, and generates document image data for display to send them to the display unit 13.

Figure 6A:
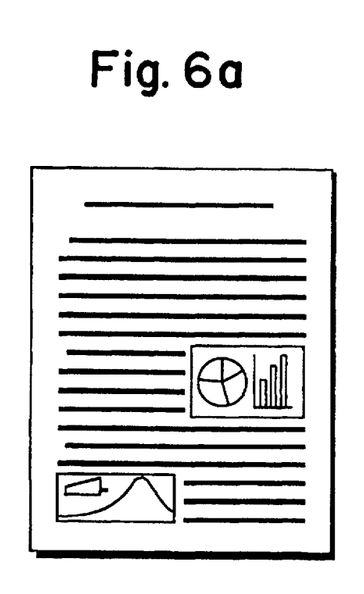
FIG. 6(a) is an example of a display when displaying a document.

The display unit 13 displays the document image data from the document data generating unit 15, whereby the document data of the current page are displayed in Step 41. The view in FIG. 6(a) illustrates the display of the document data of the current page.

When the user wishes to start page-turning retrieval, he enters YES with the input unit 12; otherwise he enters NO in Step 42.

In case that YES has been entered, the I/O control unit 14 confirms whether the currently displayed page is the last page of the document subject to page-turning retrieval or not in Step 43. If it is the last page, the I/O control unit 14 judges if there exist a following document. When there exists no following document, the I/O control unit 14 terminates the page-turning retrieval. When a following page or the first page of a following document exists, the I/O control unit 14 sets the following page or the first page to the current page in Step 44, and sends out a command to display the layout data of the current page to the layout data generating unit 16 and display unit 13. The layout data generating unit 16 fetches the layout information of the current page from the document database 11 in accordance with the aforementioned command, and generates the layout data to send them to the display unit 13. The display unit 13 displays the layout data from the layout data generating unit 16 on the screen, whereby the layout data of the current page are displayed in Step 45.

Figure 6B:
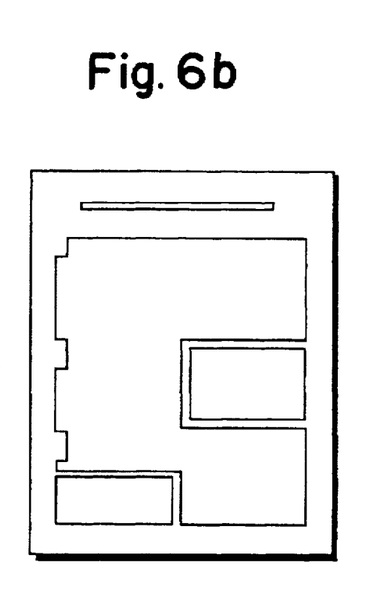
FIG. 6(b) is an example of a display when displaying the layout of the document.

The layout data, as is shown in FIG. 6(b), are vector data consisting of a set of areas divided by elements such as characters, figures, illustrations, and sentences, each of which is encircled by a rectangle. The layout data are generated based on coordinate information of the document data. The layout data requires less information to generate compared with the document image data, and thus can be displayed at a higher speed than the document image data.

The page-turning retrieval is repeated endlessly until the user enters a command to terminate the retrieval with the input unit 12. When the terminate command is entered with the input unit 12 in Step 46, the layout data of the page currently on display are replaced with the corresponding document data which is displayed in Step 47. When the displayed page are not the desired one, the user enters a command to perform the page-turning retrieval again in Step 42, so that the pages following the page currently displayed in Step 47 will be sequentially displayed one by one.

As has been described, with the electronic document filing system of the first embodiment, the page being retrieved can be displayed at an enhanced speed by displaying the layout thereof.

In this embodiment, the document data are displayed when the page-turning retrieval is terminated, but they may be displayed after a certain time interval from the termination, for example two seconds, so that the page-turning retrieval may be continued when the termination command is cancelled before the certain time interval has passed. In this case, the I/O control unit 14 generates a timer interruption when two seconds have passed since the entry of the retrieval termination command, so that the process in Step 47 will be performed. When the interruption process ends, the program returns to the main routine.

In addition, although the current page is automatically set, it may be set with an arbitrary page at a certain point, for example, at Step 42, where the page-turning retrieval starts. In this case, the user enters the title of the document and page number.

Further, although the pages are turned in one-direction, they may be turned in both-directions: the user specifies the direction with the input unit 12, then the I/O control unit 14 changes the readout direction for the document data aligned and stored in the document database 11, enabling the retrieval in the specified direction (Second Embodiment)

An electronic document filing system in accordance with the second embodiment will be explained. With the electronic document filing system of the second embodiment, a characteristic portion of a page is specified for retrieval, so that these portions alone are retrieved to be displayed sequentially.

Figure 7:
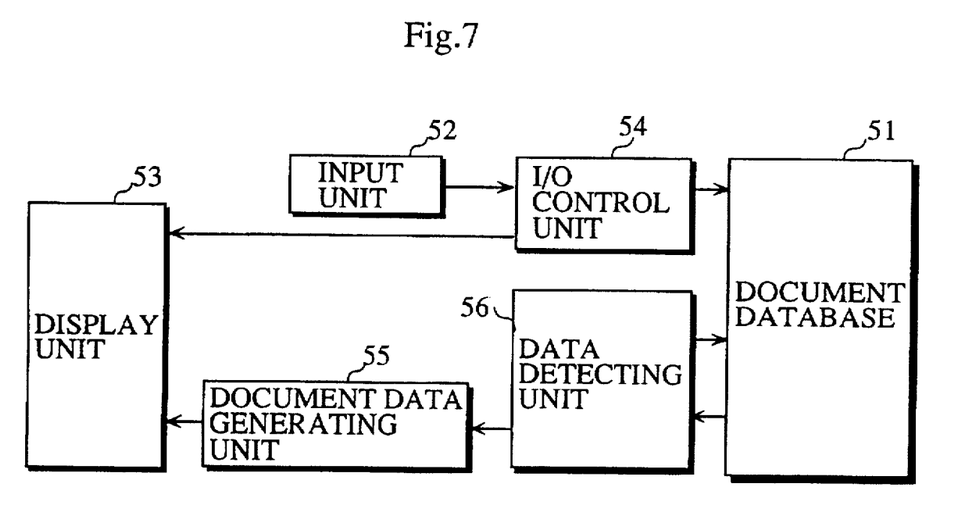
FIG. 7 is a block diagram depicting the construction of an electronic document filing system in accordance with the second embodiment of the present invention.

As is shown in FIG. 7, the electronic document filing system of the second embodiment comprises the document database 51 for storing electronic documents, an input unit 52 for controlling the system, a display unit 53 for displaying document data, an I/O control unit 54 for sending commands in accordance with input information from the input unit 52, a document data generating unit 55 for generating document data, a data detecting unit 56 for detecting a page satisfying retrieving conditions specified in accordance with an area and characteristics thereof.

The operation and function of the electronic document filing system constructed as above will be described in the following. Since the main routine of the electronic document filing system of the second embodiment is identical with that of the first embodiment, FIG. 4 is referred to for the explanation and FIG. 8 is referred to with respect to a retrieval routine.

As is shown in FIG. 4, an initialization necessary at the system activation is performed in Step 31; the first page of the first document stored in the document database 51 is set to a current page.

Next, the user enters a command as to whether or not he is going to proceed to the retrieval with the input unit 52. In case of YES, the retrieval routine is called out in Step 33; otherwise, the program is terminated in Step 32.

Figure 8:
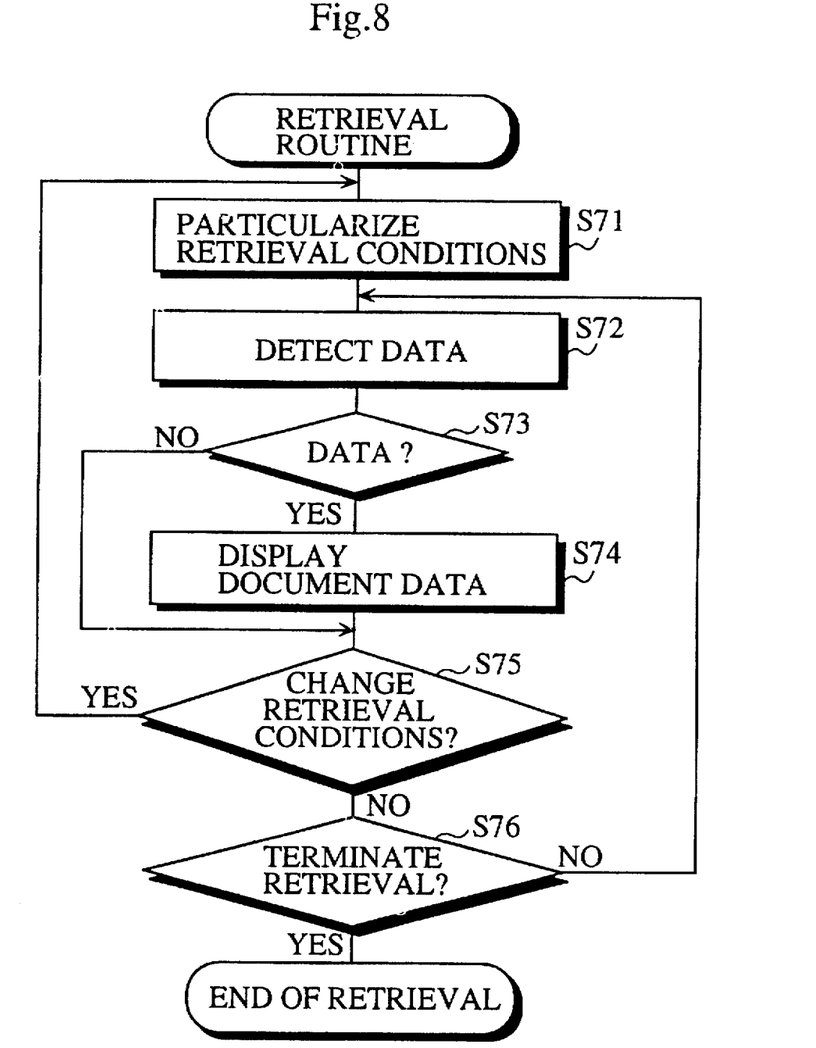
FIG. 8 is a flowchart detailing retrieval of the electronic document filing system of the second embodiment.

As is shown in FIG. 8, the user particularizes the retrieval conditions with the input unit 52 in Step 71. The area within a page subject to retrieval and characteristics thereof are particularized as the retrieval conditions. More specifically, in the first place, the I/O control unit 54 controls the display unit 53 to display a rectangular diagram representing the entire page. Then, the user specifies an area subject to retrieval with the input unit 52. Assuming that the input unit 52 is the mouse, the user specifies one end by clicking the mouse, and drags on the mouse to the a specific position while keeping the mouse button down; the other end is specified when he releases the mouse button. Thus, the rectangle, having a pair of the opposing ends, is specified as the area subject to retrieval.

In the second place, the user selects desired retrieval conditions using a retrieval condition panel, in which characteristics of a variety of specified areas have been set in advance. The retrieval conditions are, for example, "data must exist in the specified area", "graphics must exist in the specified area", "characters must exist in the specified area", "more than half of the specified area is in a particular color", and "the specified area must be blank".

Once the user has particularized the retrieval conditions, the I/O control unit 54 sends a command to detect a page satisfying the particular retrieval conditions to the data detecting unit 56. The data detecting unit 56 retrieves data corresponding to the specified area of the document in the document database 51 in accordance the above-mentioned command to retrieve an area satisfying the particular retrieval conditions in Step 72. The I/O control unit 54 sequentially reads out page data from the document database 51. The data detecting unit 56 fetches coordinate data of the minimum rectangle areas of all the character, graphic, and image areas throughout the read out page data. Then, the data detecting unit 56 compares the coordinate data of the specified area which have been previously entered with those of the minimum rectangle area to judge whether or not any portion of these areas overlaps. If there exists any overlapped portion, the data detecting unit 56 further judges the match whether there exists any data satisfying the particular retrieval conditions in the overlapped portion. For example, assuming that "graphics must exist in the specific area" is one of the retrieval conditions, the data detecting unit 56 judges the match only when the specified area overlaps on the graphic area. When the data detecting unit 56 finds the area satisfying the particular retrieval conditions in Step 73, the data detecting unit 56 sends data relating to the page containing that area to the document data generating unit 55 and I/O control unit 54. The document data generating unit 55 generates the document image data in accordance with the data from the data detecting unit 56 to send the resulting data to the display unit 53. On the other hand, the I/O control unit 54 receives data relating to the detected page from the data detecting data 56, and sends a command to display the document data to the display unit 53. Thus, the display unit 53 displays the page data sent from the document data generating unit 55 in accordance with the aforementioned command from the input/output control unit 54 in Step 74.

When the page displayed on the screen is the desired one, the user enters NO with the input unit 52 in Step 75, and subsequently enters YES indicating a retrieval termination to terminate the retrieval in Step 76.

When the page displayed on the screen is not the desired one, the user enters YES with the input unit 52 in Step 75, and subsequently enters YES indicating a retrieval continuation of the retrieval in Step 76 to continue the retrieval with the same particular retrieval conditions in Step 76.

When the user wishes to change the retrieval conditions, all he has to do is to enter YES with the input unit 52 in Step 75 to return to Step 71, where the retrieval conditions are particularized, and the user can continue the retrieval after he has changed the retrieval conditions.

In the second embodiment, the user checks whether the page on display is the one he desires or not every time the data detecting unit 56 detects a page. However, it may be arranged in such a way that the detected pages are displayed sequentially one by one and when the desired page appears on the screen, the user can suspend the sequential display.

The specified area is not limited to a rectangle as was in the second embodiment; the specified area can take any shape.

Further, the specified area is not limited to one; a plurality of areas can be specified simultaneously.

(Third Embodiment)

An electronic document filing system in accordance with the third embodiment will be explained. The electronic document filing system of the third embodiment is a modification of the second embodiment: in the second embodiment, the entire document data of a retrieved page is displayed by specifying the area subject to retrieval in the second embodiment, whereas in the third embodiment, a retrieved page is displayed both in the document image and layout image.

Figure 9:
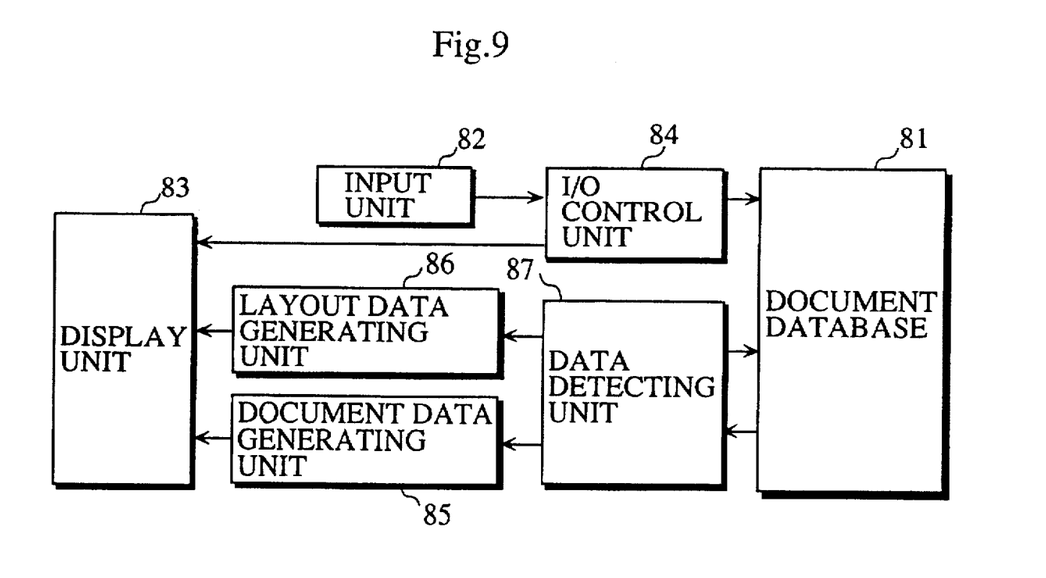
FIG. 9 is a block diagram depicting the construction of an electronic document filing system in accordance with the third embodiment of the present invention.

As is shown in FIG. 9, the electronic document filing system of the third embodiment comprises a document database 81 for storing electronic documents, an input unit 82 for controlling the system, a display unit 83 for displaying the document data, an I/O control unit 84 for sending commands in accordance with input information from the input unit 82, a document data generating unit 85 for generating the document data, a layout data generating unit 86 for generating the layout data, and a data detecting unit 87 for detecting a page satisfying retrieval conditions from the document database 81 particularized in accordance with an area and the characteristics thereof specified with the input unit 82.

In the following, the function of the electronic document filing system based on its operation will be explained. Since the main routine of the electronic document filing system of the third embodiment is identical with that of the first embodiment, FIG. 4 is referred to for the explanation, and FIG. 10 is referred to with respect to a retrieval routine.

As is shown in FIG. 4, an initialization necessary at the system activation is performed in Step 31; the first page of the first document stored in the document database 81 is set into a current page.

Next, the user enters a command as to whether or not he is going to proceed to the retrieval with the input unit 82. In case of YES, the retrieval routine is called out in Step 33; otherwise, the program is terminated in Step 32.

Figure 10:
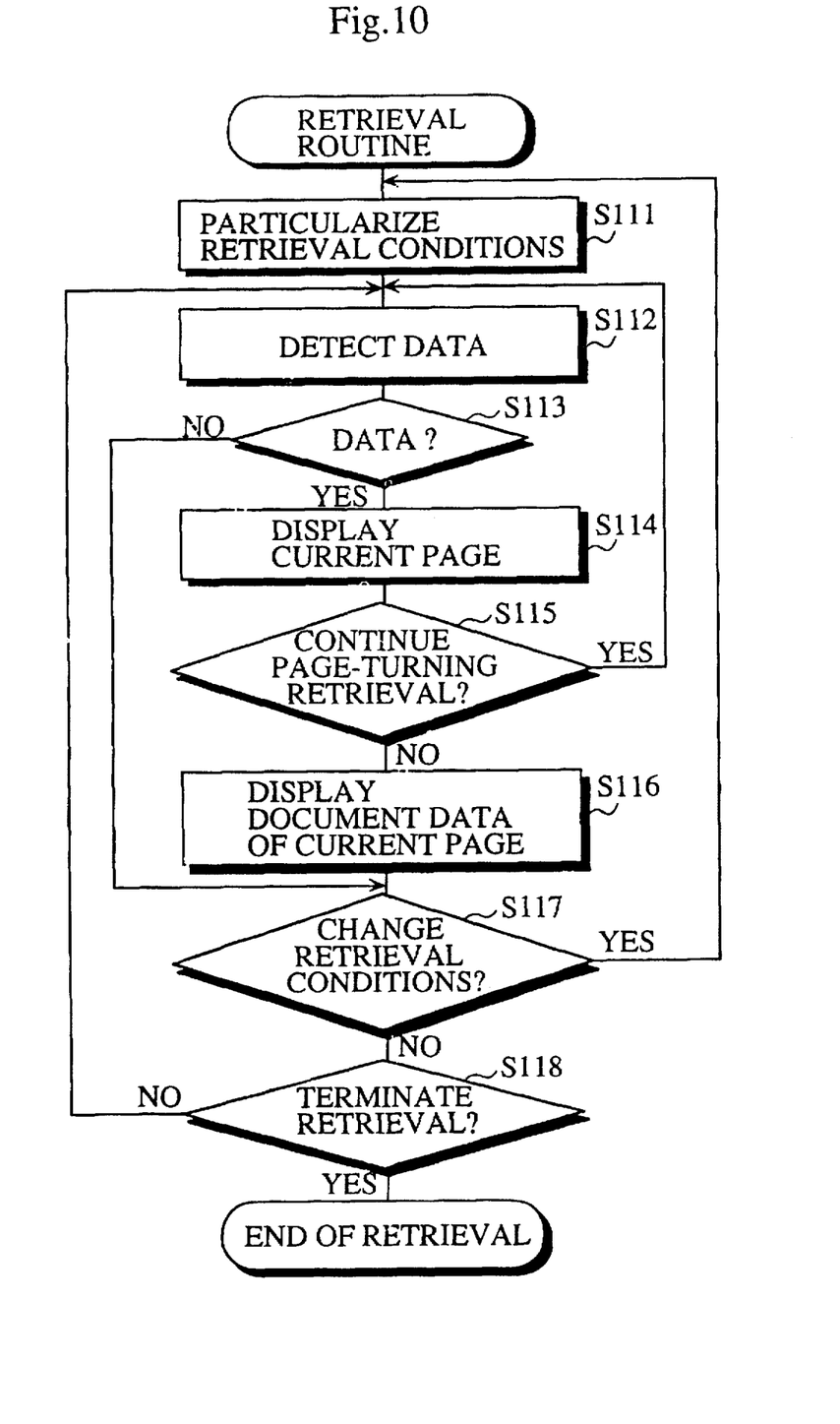
FIG. 10 is a flowchart detailing retrieval of the electronic document filing system of the third embodiment.

As is shown in FIG. 10, in the retrieval routine, the user particularizes the retrieval conditions with the input unit 82. Since the operation to particularize the retrieval conditions is identical with that in the second embodiment, the explanation thereof is omitted. Once the user particularized the retrieval conditions, the I/O control unit 84 sends a command to detect a page satisfying the particular retrieval conditions to the data detecting unit 87.

The data detecting unit 87 retrieves an area satisfying the particular retrieval conditions from the document database 81 in accordance with the aforementioned command in Step 112. When the data detecting unit 87 detects an area satisfying the particular retrieval conditions in Step 113, it sends data related to a page containing the area to the document data generating unit 85, layout data generating unit 86, and I/O control unit 84.

The document data generating unit 85 generates the document image data of the specified area in accordance with the page information from the data detecting unit 87 to send the resulting data to the display unit 83.

The layout data generating unit 86 generates layout data of the remaining areas other than the specified one within the page in accordance with the page information from the data detecting unit 87 to send the resulting data to the display unit 83.

The I/O unit 84 sends a command to display data to the display unit 83 in accordance with the page information from the data detecting unit 87.

Figure 11A:
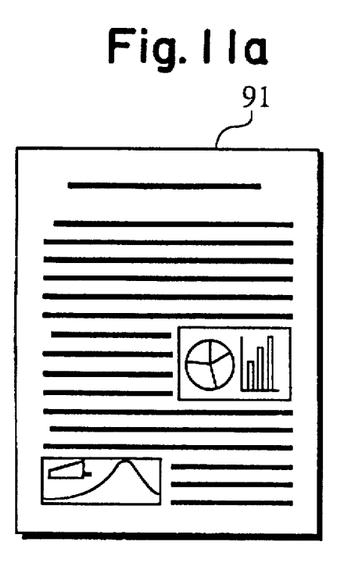
FIG. 11(a) is an example of a display when displaying a document.
Figure 11B:
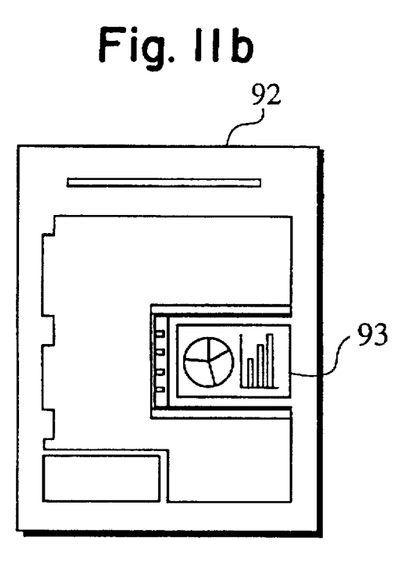
FIG. 11(b) is an example of a display during the retrieval.

The display unit 83 combines the document image data and layout data sent from the document data generating unit 85 and layout data generating unit 86 respectively in accordance with the command from the I/O control unit 84 to display the resulting data in Step 114. An example of the display is shown in FIG. 11(b). In the drawing, with respect to the detected page 92, the specified area 93 is displayed in the document image, and the remaining areas other than the specified area 93 within the page 92 are displayed in the layout image. The user watches this display and checks approximately if the display is of the desired page or not.

When the display is not of the desired page, the user enters a command to continue the retrieval with the input unit 82, whereby the retrieval is continued.

When a command to terminate the page-turning retrieval is inputted with the input unit 82, the I/O control unit 84 sends a command to display the document data of the page currently displayed to the document data generating unit 85 and display unit 83. The document data generating unit 85 generates the document image data in accordance with the aforementioned command from the I/O control unit 84 to send them to the display unit 83. Thus, the display unit 83 displays the data from the document data generating unit 85 in accordance with the aforementioned command from the I/O control unit 84 in Step 116.

The user visually confirms the displayed page, and when the displayed page is the desired one, the user enters NO with the input unit 82 in Step 117, and subsequently enters YES to terminate the retrieval in Step 118.

When the displayed page is not the desired page, and the user wishes to continue the retrieval with the same particular retrieval conditions, the user enters NO with the input unit 82 in Step 117, and subsequently enters NO to continue the retrieval in Step 118.

When the user wishes to change the retrieval conditions, he enters YES with the input unit 82 in Step 117 to return to Step 111, so that he can change the retrieval conditions and continue the retrieval.

In the third embodiment, the document data are displayed when the page-turning retrieval is terminated, but they may be displayed after a certain time interval from the termination, for example two seconds, so that the page-turning retrieval may be continued when termination command is cancelled before the certain time interval has passed.

In addition, although the current page is automatically set, it may be set with an arbitrary page at a certain point.

Further, although the pages are turned in one-direction, they may be turned in both-directions.

Although the present invention has been fully described by way of example with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An electronic document retrieval system for continuous retrieving and displaying a desired page from document data in an electronic file comprising:

document storing means for storing the document data;

input means for entering a page location specifying an area subject to retrieval, retrieval information specifying image characteristics of the area subject to retrieval, and a retrieval mode command for retrieving the document data page by page;

image data generating means for generating page image data for displaying the document data of a retrieved page;

data detecting means for retrieving data of the area subject to retrieval within the document data stored in said document data storing means in accordance with the retrieval mode command and said retrieval information from said input means to output the document data of a page containing a data area that matches with said retrieval information to said image data generating means; and display means for displaying the page image data generated by said image data generating means.

2. The electronic document retrieval system claimed in claim 1, wherein said data detecting means retrieves a plurality of areas subject to retrieval specified by said input means.

3. The electronic document retrieval system claimed in claim 1, wherein said document data storing means stores said document data for each page according to a predetermined hierarchy, and said control means controls the system to retrieve said document data for each of said pages in accordance with the predetermined hierarchy in a retrieval direction specified by a user with said input means.

4. A method of retrieving a desired page from document data stored in an electronic file, comprising the steps of:

(1) particularizing retrieval conditions as to:
  an area location specifying an area subject to retrieval within a pages and
  retrieval information defining image characteristics of the area subject to retrieval;

(2) retrieving data of the area subject to retrieval of the document data stored in said electronic file to extract the document data of a page containing a data area that matches with said retrieval information; and (3) displaying the image data of said extracted page.

5. The method claimed in claim 4, wherein said document data are aligned and filed per page in said electronic file, and retrieved in a certain direction specified by a user in the second step.

6. The method claimed in claim 4, wherein the existence of the data, characters, diagrams, and pictures are set as the retrieval conditions in the first step.

7. A method of retrieving a desired page from document data in an electronic file, comprising the steps of:

(1) particularizing retrieval conditions as to an area location specifying an area to be retrieved in a page and retrieval data defining image characteristics of the area subject to retrieval;

(2) retrieving data of the area subject to retrieval in said electronic file to extract the document data of a page containing a data area that matches with said retrieval information; and (3) displaying the image data of the area corresponding to the area subject to retrieval and displaying the remaining areas other than the area subject to retrieval within a retrieved page in a layout image.

8. The method claimed in claim 7, wherein said document data are aligned and filed per page in said electronic file, and retrieved in a certain direction specified by a user in the second step.

9. The method claimed in claim 7, wherein the existence of the data, characters, diagrams, and pictures are set as the retrieval conditions in the first step.

10. A document processing apparatus for rapid automated page-by-page scanning of document data, comprising:

retrieval means for retrieving document data page by page;

user input means for inputting an image display command;

storage means for storing document data on a page and positional information of said document data on said page;

layout data generating means for generating layout data from said positional information for each page retrieved, said layout data comprising perimeter lines of each document data on the page;

display means for displaying document data and layout data; and display control means for automatically causing said display means to sequentially display layout data for each retrieved page until an image display command is received, and then causing said display means to display said document data for the currently retrieved page.

11. The document processing apparatus as recited in claim 10 wherein said display control means causes said display means to display a synthesized image comprising both layout data and document data for each retrieved page until said image display command is received, and then causing said display means to display said document data for the currently retrieved page.

12. A document processing apparatus for rapid automated page-by-page scanning of document data, comprising:

retrieval means for retrieving document data page by page;

user input means for inputting an image display command and a predetermined search condition indicative of a specified area of a document page;

judging means for judging whether a retrieved page satisfies said predetermined search condition;

storage means for storing document data on a retrieved page and positional information of said document data on said page;

layout data generating means for generating layout data from said positional information for each retrieved page judged to satisfy said predetermined search condition;

display means for displaying document data and layout data; and display control means for automatically causing said display means to display layout data for each retrieved page judged to satisfy said predetermined search condition until said image display command is inputted, and then causing said display means to display said document data for the currently retrieved page.

13. An electronic document searching method comprising the steps of:

retrieving a document page by page from a storage medium;

automatically generating layout data of the currently retrieved page;

automatically displaying the layout data of the currently retrieved page;

displaying the document data of the currently retrieved page if a display command is received, otherwise generating and displaying the layout data of the next retrieved page; and retrieving the entire document associated with the currently retrieved page if a document retrieval command is received.

14. The document searching method of claim 13 further including the step of entering a predetermined search criteria wherein the automatic displaying of the layout data of the currently retrieved page is performed only when the currently retrieved page meets a predetermined search criteria.

15. The document searching method of claim 14 wherein the predetermined search criteria is limited to a specified area of said currently retrieved page.

16. An electronic document retrieval system for continuous rapid scanning and retrieval of pages of document data stored in an electronic file for display, comprising:

document data storing means for storing the document data;

input means for entering a retrieval mode command for retrieving the document data page by page and for entering a document display mode command for displaying said retrieved pages of document data;

layout data generating means for generating layout data to illustrate only an outline of each area to be displayed within a page in accordance with the document data contained on said page fetched from said document storing means;

image data generating means for generating page image data for displaying the document data of a retrieved page;

control means for continuous, automatic fetching of said document data stored in said document data storing means in accordance with the retrieval mode command entered from said input means and transmitting said document data to said layout data generating means, and for fetching the document data of a specified page from said document data storing means in accordance with the fetched document display mode command from said input means to output the document data of the specified page to said image data generating means; and display means for displaying the data generated by said image data generating means and for displaying said layout data generating means.

17. The electronic document retrieval system claimed in claim 16, wherein said layout data generating means generates the layout data to illustrate an outline of each character area, diagram area, and picture area contained in the page.

18. The electronic document retrieval system as claimed in claim 16, wherein said control means retrieves the document data of a page following the page being currently displayed when the retrieval mode command is entered again from said input means before said specified time interval has elapsed.

19. An electronic document retrieval system for continuous retrieving and displaying a desired page from document data in an electronic file, comprising:

document storing means for storing the document data;

input means for entering a page location specifying an area subject to retrieval, retrieval information specifying image characteristics of the area subject to retrieval, and a retrieval mode command for retrieving the document data page by page;

image data generating means for generating page image data for displaying the document data of a retrieved page;

data detecting means for retrieving data of the area subject to retrieval within the document data stored in said document data storing means in accordance with the retrieval mode command and said retrieval information from said input means to output the document data of a page containing a data area that matches with said retrieval information to said image data generating means; and display means for displaying the page image data generated by said image data generating means.

20. The electronic document retrieval system claimed in claim 19, wherein said data detecting means retrieves a plurality of areas subject to retrieval specified by said input means.

21. The electronic document retrieval system claimed in claim 19, wherein said document data storing means stores said document data for each page according to a predetermined hierarchy, and said control means controls the system to retrieve said document data for each of said pages in accordance with the predetermined hierarchy in a retrieval direction specified by a user with said input means.

22. A method of retrieving a desired page from document data stored in an electronic file, comprising the steps of:

(1) particularizing retrieval conditions as to:

an area location specifying an area subject to retrieval within a page; and retrieval information defining image characteristics of the area subject to retrieval;

(2) retrieving data of the area subject to retrieval of the document data stored in said electronic file to extract the document data of a page containing a data area that matches with said retrieval information; and (3) displaying the image data of said extracted page.

23. The method claimed in claim 21, wherein said document data are aligned and filed per page in said electronic file and retrieved in a certain direction specified by a user in the second step.

24. The method claimed in claim 21, wherein the existence of the data, characters, diagrams, and pictures are set as the retrieval condition in the first step.

25. A method of retrieving a desired page from document data in an electronic file, comprising the steps of:

(1) particularizing retrieval conditions as to an area location specifying an area to be retrieved in a page and retrieval data defining image characteristics of the area subject to retrieval;

(2) retrieving data of the area subject to retrieval of the document data in said electronic file to extract the document data of a page containing a data area that matches with said retrieval information; and (3) displaying the image data of the area corresponding to the area subject to retrieval and displaying the remaining areas other than the area subject to retrieval within a retrieved page in a layout image.

26. The method claimed in claim 25, wherein said document data are aligned and filed per page in said electronic file, and retrieved in a certain direction specified by a user in the second step.

27. The method claimed in claim 25, wherein the existence of the data characters, diagrams, and pictures are set as the retrieval condition in the first step.

* * * * *